United States Patent
Endo

(10) Patent No.: US 8,634,471 B2
(45) Date of Patent: Jan. 21, 2014

(54) MOVING IMAGE ENCODING APPARATUS, CONTROL METHOD THEREOF AND COMPUTER-READABLE STORAGE MEDIUM

(75) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 12/888,505

(22) Filed: Sep. 23, 2010

(65) Prior Publication Data

US 2011/0075736 A1    Mar. 31, 2011

(30) Foreign Application Priority Data

Sep. 29, 2009 (JP) .................................. 2009-225570
Sep. 7, 2010 (JP) .................................. 2010-200292

(51) Int. Cl.
*H04N 7/12* (2006.01)

(52) U.S. Cl.
USPC .................................................. 375/240.16

(58) Field of Classification Search
USPC .................................................. 375/240.16
See application file for complete search history.

(56) References Cited

U.S. PATENT DOCUMENTS

2005/0276328 A1* 12/2005 Sakamoto ................ 375/240.16

FOREIGN PATENT DOCUMENTS

| JP | 11-298904 | 10/1999 |
| JP | 2005-354528 | 12/2005 |

* cited by examiner

*Primary Examiner* — Sath V Perungavoor
*Assistant Examiner* — Xiaolan Xu
(74) *Attorney, Agent, or Firm* — Cowan, Liebowitz & Latman, P.C.

(57) ABSTRACT

The present invention enables searching for an appropriate motion vector even with respect to a moving image with a large amount of motion. Further, the present invention enables searching for an appropriate motion vector even with respect to a moving image including an object that does not uniformly move in a frame image. One aspect of embodiments of the present invention relates to a moving image encoding apparatus configured to divide an input image into a plurality of blocks, and to perform predictive encoding using motion compensation for each of the plurality of blocks, the moving image encoding apparatus.

11 Claims, 7 Drawing Sheets

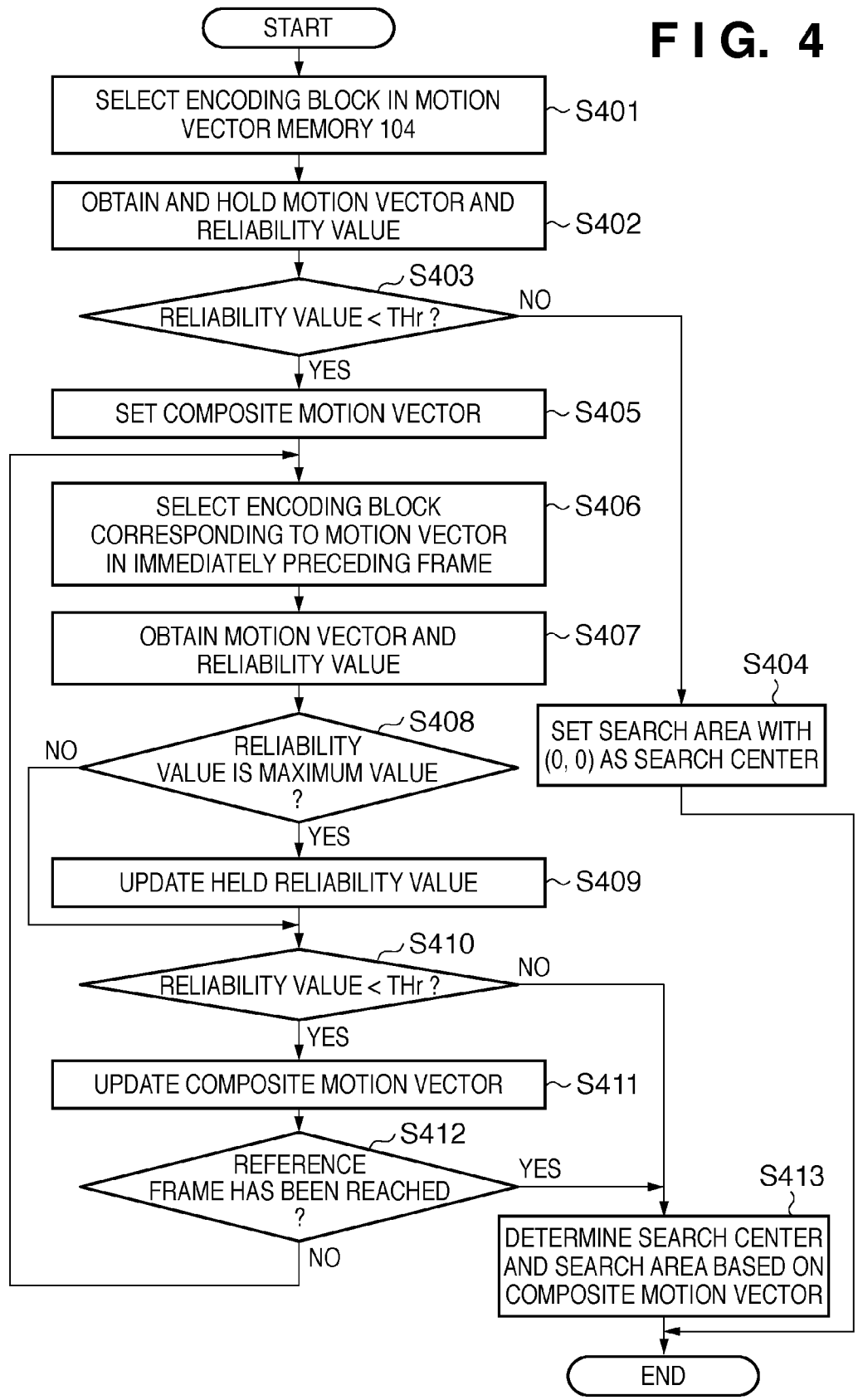
F I G. 4

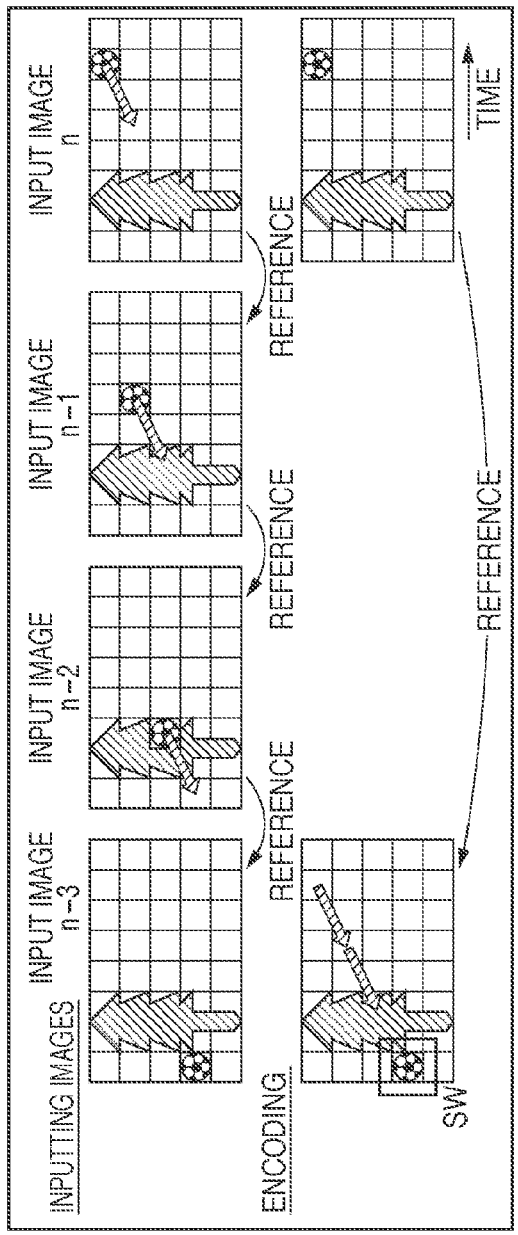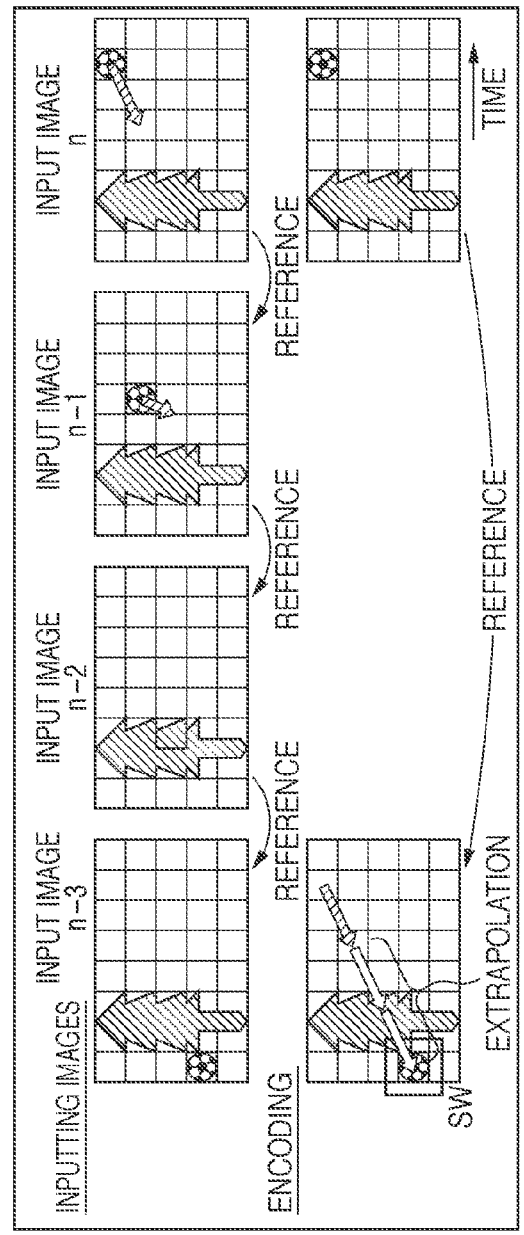

MOVING IMAGE ENCODING APPARATUS, CONTROL METHOD THEREOF AND COMPUTER-READABLE STORAGE MEDIUM

BACKGROUND OF THE INVENTION

1. Field of the Invention

The present invention relates to a moving image encoding apparatus, a control method thereof and a computer-readable storage medium, and in particular to the technology of motion vector search.

2. Description of the Related Art

Conventionally, for example, a digital video camera is well known as a camera-integrated moving image recording apparatus that shoots a subject, and records thus obtained moving images after compressing them. In recent years, recording media have shifted from conventional magnetic tape to disk media, semiconductor memories, and the like because of their high convenience such as allowing random access. As a compression scheme, MPEG-2 is generally used, which enables compression with a high compression rate using inter-frame motion prediction, and furthermore in recent years, H.264 and other schemes are used, which enable compression with a still higher compression rate.

An encoding apparatus that employs such a compression scheme needs to search for inter-frame motion vectors in each of the macro blocks serving as the base units to be encoded, into which a frame image has been divided. Generally, motion vector search is realized by pattern matching, and it is well known that a large number of computations are necessary therefor. Accordingly, a method is often adopted in which a search area is narrowed down and set, and then a motion vector is searched for in that search area.

In view of this, a technique as disclosed in Japanese Patent Laid-Open No. 11-298904 has been proposed in order to effectually obtain a motion vector in a larger area while reducing the number of computations. In Japanese Patent Laid-Open No. 11-298904, first, a coarse search for motion vectors is performed using reduced images, and then a detailed search is performed around the motion vectors obtained through the coarse search, using the original images that have not been reduced.

Further, Japanese Patent Laid-Open No. 2005-354528 has proposed a method for determining a motion vector search area in accordance with a global vector indicating the motion of the entire frame and the reliability of this global vector.

SUMMARY OF THE INVENTION

However, with the configuration of the above conventional technology, in the case of moving images with a particularly large amount of motion such as sport videos, motion search in a sufficiently large area cannot be performed, and thus appropriate motion vectors between frame images cannot be searched for. Further, there is a case of encoding a moving image in which although most of a frame image such as a background is stationary, an object, which is a part thereof, is moving. In such a case, with the method using a global vector, it may be judged that there is no motion as the entire frame (vector 0), and thus a search area in a macro block including a moving object cannot be determined at an appropriate position.

In view of this, the present invention enables searching for an appropriate motion vector even with respect to a moving image with a large amount of motion. Further, the present invention enables searching for an appropriate motion vector even with respect to a moving image including an object that does not uniformly move in a frame image.

One aspect of embodiments of the present invention relates to a moving image encoding apparatus configured to divide an input image into a plurality of blocks, and to perform predictive encoding using motion compensation for each of the plurality of blocks, the moving image encoding apparatus comprising, a first motion search unit configured to calculate, using the input image and an image that is positioned temporally immediately preceding the input image, a difference between pixel values for each of the plurality of blocks, and to calculate a first motion vector for each of the plurality of blocks based on a positional relationship in which the difference is minimal, a motion vector memory configured to store the first motion vectors in association with positions of the plurality of blocks of the input image, and to hold the first motion vectors related to a plurality of temporally successive images, a search position determination unit configured to determine for each of the plurality of blocks, in accordance with the first motion vectors held in the motion vector memory, a position where motion search is to be performed in a reference image that is referenced when motion compensation is performed, a second motion search unit configured to set, based on the position determined by the search position determination unit, a search area of a prescribed size in the reference image for each of the plurality of blocks, and to determine, within the search area, a second motion vector for each of the plurality of blocks, and an encoding unit configured to perform predictive encoding using motion compensation based on the second motion vector determined by the second motion search unit, wherein, if an image that is not temporally adjacent to the input image is the reference image, with a method for selecting, using each of the plurality of blocks of the input image as a starting point, a block of an immediately preceding image in accordance with the first motion vector corresponding to a position of the block, the search position determination unit tracks a plurality of the first motion vectors related to images between the input image and the reference image, calculates a composite motion vector that is obtained by adding the plurality of tracked first motion vectors such that the plurality of first motion vectors are successive, and determines, based on the composite motion vector, a position where motion search is to be performed in the reference image for each of the plurality of blocks.

Another aspect of embodiments of the present invention relates to a moving image encoding apparatus configured to divide an input image into a plurality of blocks, and to perform predictive encoding using motion compensation for each of the plurality of blocks, the moving image encoding apparatus comprising, a first motion search unit configured to calculate, using the input image and an image that is positioned temporally immediately preceding the input image, a difference between pixel values for each of the plurality of blocks, and calculates a first motion vector for each of the plurality of blocks based on a positional relationship in which the difference is minimal, a global motion search unit configured to calculate a global vector by comparing pixel values of the input image and pixel values of an image that is positioned temporally immediately preceding the input image, a motion vector memory configured to store the first motion vectors in association with positions of the plurality of blocks of the input image, and holds the first motion vectors related to a plurality of temporally successive images, a search position determination unit configured to determine, for each of the plurality of blocks, in accordance with the first motion vectors held in the motion vector memory and the global vector, a position where motion search is to be performed in a reference image that is referenced when motion compensation is performed, a second motion search unit configured to set, based on the position determined by the search position determination unit, a search area of a prescribed size in the reference image for each of the plurality of blocks, and determines a second motion vector in the search area for each of the plurality of blocks, and an encoding unit configured to perform predictive encoding using motion compensation based on the second motion vector determined by the second motion search unit.

Further features of the present invention will become apparent from the following description of exemplary embodiments with reference to the attached drawings.

BRIEF DESCRIPTION OF THE DRAWINGS

FIG. 4 is a flowchart of processing performed by a search position determination unit 105 according to Embodiment 1.

FIGS. 6A and 6B are conceptual diagrams illustrating the way to obtain a composite motion vector.

DESCRIPTION OF THE EMBODIMENTS

Hereinafter, embodiments of the present invention are described with reference to the drawings.

Embodiment 1

Figure 1:
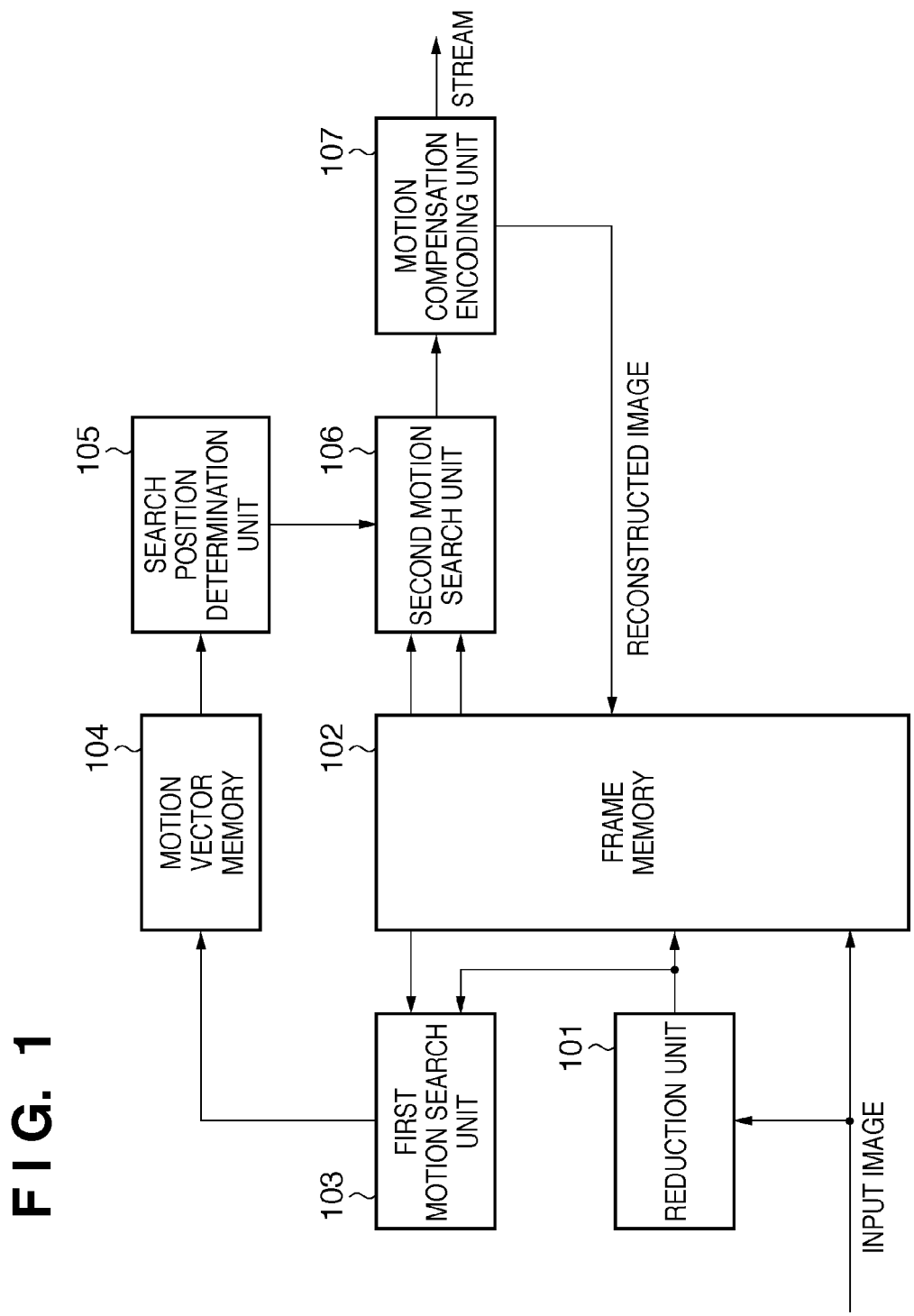
FIG. 1 is a block diagram showing the configuration of a moving image encoding apparatus according to Embodiment 1.

FIG. 1 is a block diagram showing the configuration of a moving image encoding apparatus according to Embodiment 1 of the present invention. Hereinafter, the operation performed when images are input and the operation performed when encoding is performed are separately described. In the moving image encoding apparatus in FIG. 1, blocks may be constituted as hardware using a dedicated logic circuit and a memory. Alternatively, the blocks may be constituted as software by the CPU that executes a processing/control program stored in a memory.

Inputting Images

Input images (frame image data) are stored in a frame memory 102, and reduction processing for reducing resolution is performed thereon by a reduction unit 101, and reduced images of the input images are stored in the frame memory 102. The reduced images stored in the frame memory 102 are utilized when processing the next input image (first motion search). The reduced images of the input images are also input to a first motion search unit 103. In the present embodiment, both the horizontal and vertical image reduction ratios are set to ¼ as an example. Reduction processing can be performed using a known smoothing filter, for instance, or through subsampling. Note that although a configuration is adopted in the present embodiment in which reduced images of input images are generated and a first motion search is performed using the reduced images to reduce the processing load, it is not absolutely necessary to generate reduced images, and the first motion search may be performed using the input images.

The first motion search unit 103 searches for a motion vector (first motion vector) of an input reduced image, using a reduced image of a frame image (immediately preceding frame) that is stored in the frame memory 102 and positioned temporally immediately preceding it as a reference image. The first motion search unit 103 searches for a first motion vector for each reduced encoding block, and in the present embodiment, the size of an encoding block normally obtained by dividing an image is set to 16 pixels both horizontally and vertically, as an example.

Accordingly, a reduced encoding block (reduced block) becomes a block having 4 pixels both horizontally and vertically. The first motion search unit 103 reads out reference image data included in a search area from the frame memory 102. In motion search, the sum of the absolute values of the difference between pixel values of 4×4 pixel image data read out from certain coordinates in the reference image included in the search area and image data of an encoding block to be encoded is calculated, and this sum is taken as an evaluation value of the coordinates. After that, an evaluation value is calculated for each of the coordinates while changing the coordinates from which data is read out in the search area, and a motion vector of that encoding block is determined based on the positional relationship in which the evaluation value is minimal. At this time, the evaluation value corresponding to the determined motion vector is determined as a reliability value that indicates the degree of reliability of the motion vector.

The motion vector and the reliability value that have been determined are stored in a motion vector memory 104 in association with the position of each block of the input image. Note that here, the degree of reliability of a motion vector is assumed to be an evaluation value (reliability value) of a pixel difference, and it is determined that the degree of reliability is higher the smaller the reliability value is (the smaller the pixel difference is), and the degree of reliability is lower the greater the reliability value is (the greater the pixel difference is). In the motion vector memory 104, first motion vectors and reliability values of the blocks for at least six frame images (corresponding to twice the P picture interval) are held.

Encoding

Frames are sequentially stored in the frame memory 102 in the order of the first frame, the second frame, the third frame, and so on. Frame image data is retrieved from the frame memory in the rearranged order in which the frames will be encoded, such as the third frame, the first frame, the second frame, and so on, for example. The moving image encoding apparatus according to Embodiment 1 of the present invention performs encoding in accordance with the H.264 encoding scheme, for example. That encoding includes "intra-predictive encoding" in which encoding is performed using only image data in a frame, and "inter-predictive encoding" in which encoding is performed including inter-frame prediction as well. In inter-frame prediction, there are P pictures in which prediction is performed on encoding blocks with a single reference frame, and B pictures in which prediction is performed on encoding blocks with up to two reference frames. Pictures for which intra-predictive encoding is performed are called I pictures.

Figure 2:
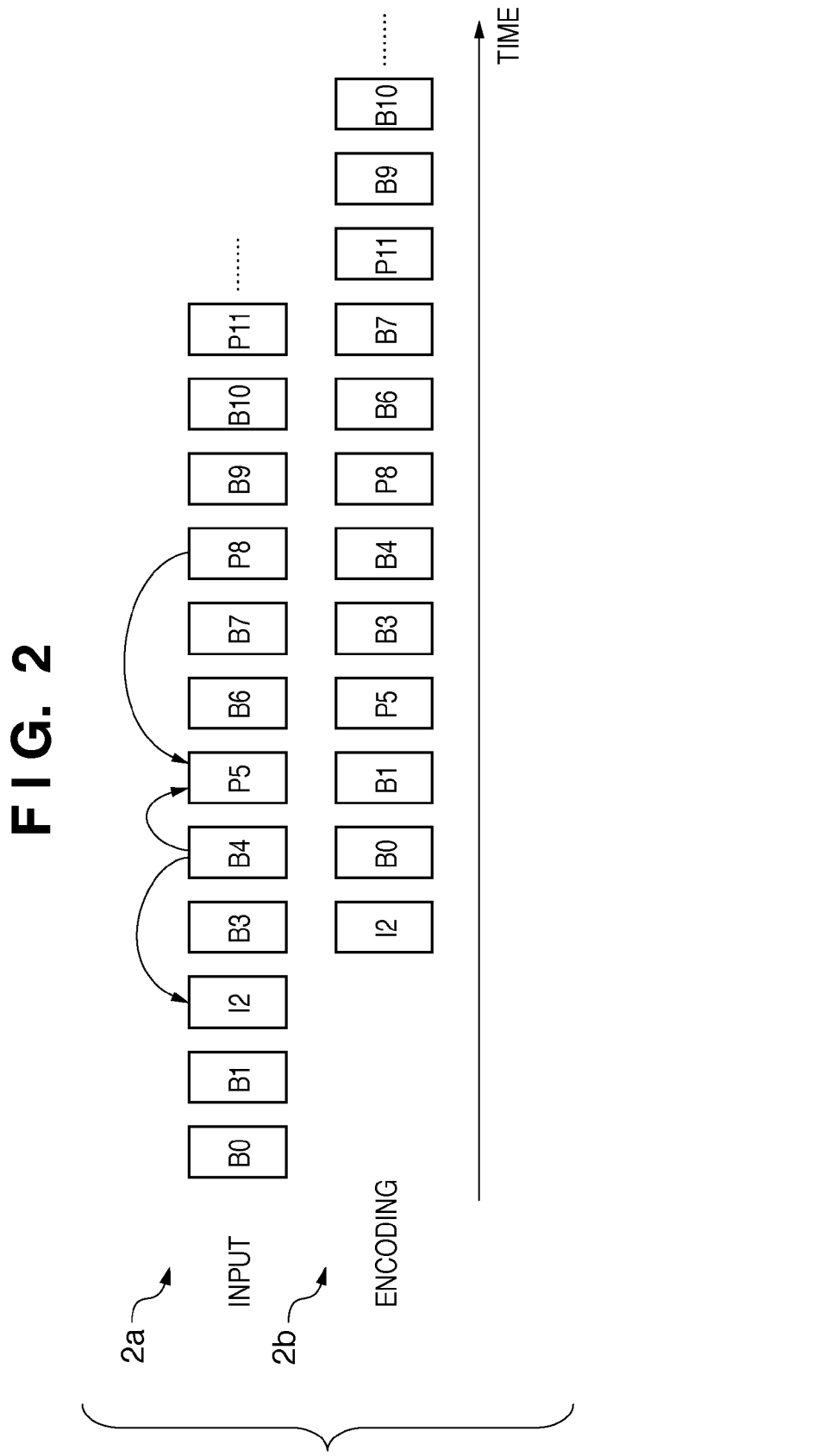
FIG. 2 is a diagram illustrating the relationship between the encoding picture types in the order in which frame images are input and the order in which frame images are encoded.

The reason why the order in which frames are encoded differs from the order in which the frames are input is to enable prediction with frames that lie in the future (backward prediction). FIG. 2 shows the relationship between the encoding picture types in the order (2*a*) in which frame images are input and the order (2*b*) in which frame images are encoded. In FIG. 2, I, P, and B respectively denote I pictures, P pictures, and B pictures, and the numbers that follow thereafter denote the order in which the frames are input. Further, in the present embodiment, as an example, a motion vector of a P picture is obtained by referencing the immediately preceding I or P picture in the input order, and a motion vector of a B picture is obtained by referencing the immediately preceding and following I or P pictures in the input order. For example, the P5 frame is referenced for the P8 frame, and the I2 and P5 frames are referenced for the B4 frame.

The operation performed in the case where the P8 frame is encoded is described below as an example. The motion vector memory 104 is configured of a plurality of banks, and first motion vectors and reliability values thereof for one frame, which use the immediately preceding frame as a reference image for the respective encoding blocks, are stored in each bank. Further, the motion vector memory 104 holds first motion vectors and reliability values thereof related to a plurality of (for example, six) temporally successive frame images with use of the plurality of banks.

Figure 3:
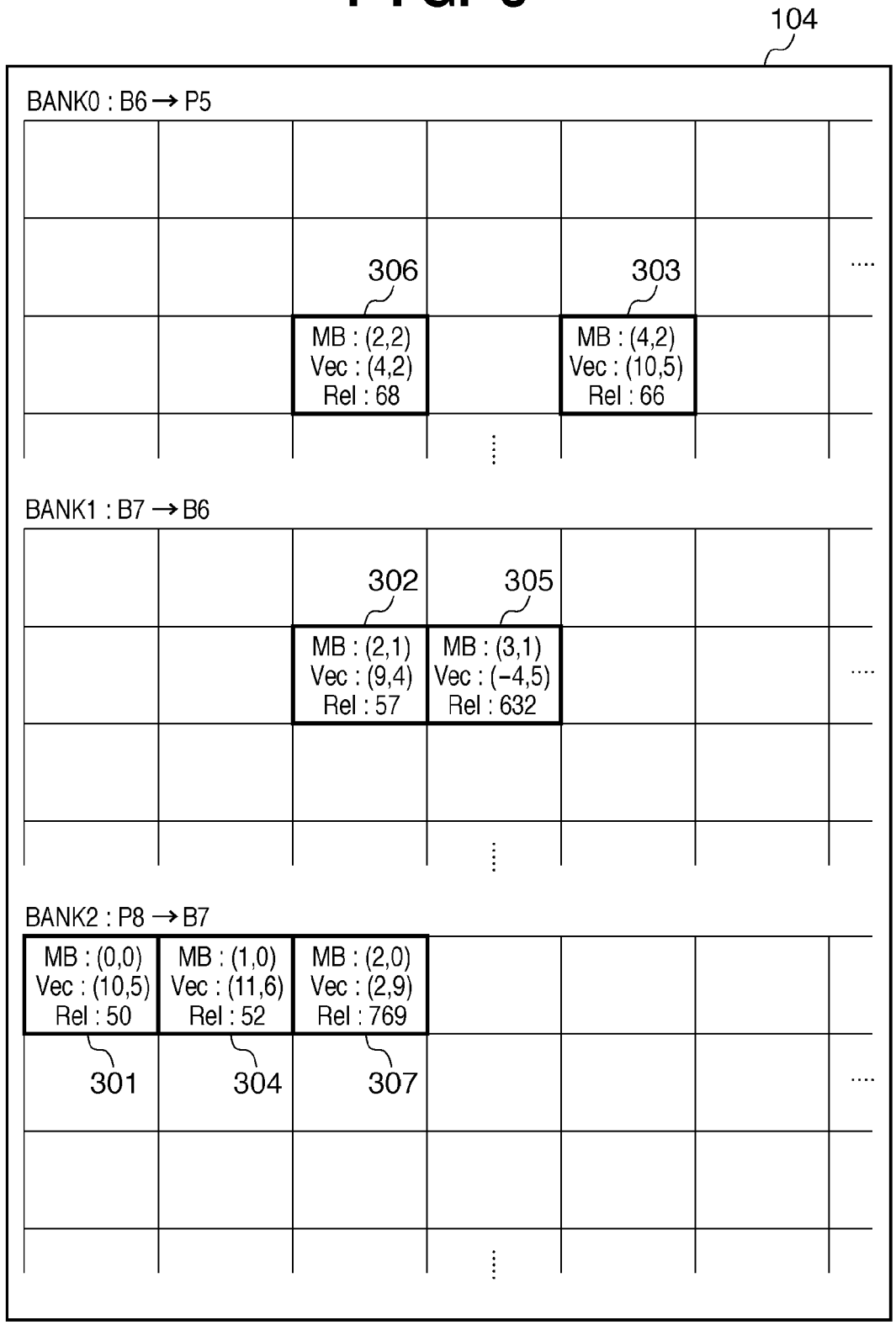
FIG. 3 is a diagram schematically showing the content of a motion vector memory.

FIG. 3 schematically shows the content of the motion vector memory 104 when encoding the P8 frame. One box corresponds to one encoding block, and "MB: (h, v)" in FIG. 3 indicates that the coordinates of the encoding block are (h, v). "Vec: (h, v)" indicates that a first motion vector of the encoding block determined by the first motion search unit 103 is (h, v). "Rel: A" indicates that a reliability value of the first motion vector of the encoding block determined by the first motion search unit 103 is A. Note that although information is written only in some encoding blocks as necessary for description, and information for other encoding blocks is omitted in FIG. 3, information is in fact similarly stored in all the blocks.

FIG. 4 is a flowchart showing an example of processing performed by a search position determination unit 105. Processing performed by the search position determination unit 105 is described with reference to the flowchart in FIG. 4. Note that the flowchart can be implemented by a computer such as a CPU that functions as the search position determination unit 105 executing a corresponding program (stored in a ROM or the like), for example.

The search position determination unit 105 selects one encoding block of an input image to be encoded that is stored in the motion vector memory 104 in S401, and obtains and holds a first motion vector of the selected block and the reliability value thereof in S402. In S403, the search position determination unit 105 judges whether or not the obtained reliability value is smaller than a threshold value THr. At this time, the degree of reliability is lower the greater the reliability value is, and thus it is judged whether the reliability value is smaller than the threshold value THr. If the reliability value is smaller than the threshold value THr, it is considered that the degree of reliability is high, and thus the procedure advances to S405. On the other hand, if the reliability value is greater than or equal to the threshold value THr, it is considered that the degree of reliability is low, and thus the procedure advances to S404. In S404, the search position determination unit 105 determines a motion vector search area of a prescribed size for the block selected in S401, setting the search center to (0, 0), that is, to the position of that block itself. The motion vector search area determined in S404 is a position where motion search is to be performed in a reference frame that is referenced by a second motion search unit 106 when performing motion compensation.

On the other hand, in S405, the search position determination unit 105 sets the first motion vector obtained from the motion vector memory 104 in S402 as a composite motion vector. Subsequently, in S406, the search position determination unit 105 selects a block corresponding to the position indicated by the composite motion vector in the temporally immediately preceding frame. In S407, the search position determination unit 105 obtains a first motion vector of the block selected in S406 and a reliability value thereof from the motion vector memory 104.

Subsequently, in S408, the search position determination unit 105 judges whether or not the reliability value obtained in S407 is greater than the reliability value that is already held (in S402 or that of another block in S409) (that is, the reliability is the lowest). If the reliability value obtained in S407 is the maximum value ("YES" in S408), the procedure advances to S409. On the other hand, if it is not the maximum value ("NO" in S408), the procedure advances to S410.

In S409, the search position determination unit 105 updates the value of the reliability value that has been held in association with the composite motion vector. Subsequently, in S410, the search position determination unit 105 judges whether or not the reliability value obtained in S407 is smaller than the threshold value THr. If the reliability value is smaller than the threshold value THr ("YES" in S410), the procedure advances to S411. On the other hand, if the reliability value is greater than or equal to the threshold value THr ("NO" in S410), the procedure advances to S413.

In S411, the search position determination unit 105 updates the composite motion vector based on the motion vector obtained in S407. Updating a composite motion vector will be described later. After that, in S412, the search position determination unit 105 judges whether or not the frame to be encoded selected in S401 has reached a reference frame that is referenced when motion compensation is performed. If it has reached this reference frame ("YES" in S412), the procedure advances to S413, and if the reference frame has not been reached, the procedure returns to S406. In S413, the search position determination unit 105 determines, based on the composite motion vector set at that time, a search center and a motion vector search area of a prescribed size on the basis of the search center. The motion vector search area determined in S413 is a position where motion search is to be performed in a reference frame that is referenced by the second motion search unit 106 when performing motion compensation.

Below is a more specific description of the flow of the above processing using blocks 301, 304, and 307 of P8 shown in FIG. 3 as examples. For each block of P8, a first motion vector and a reliability value thereof have been obtained using B7 as a reference image, which is the immediately preceding frame in the input order. Information on the first motion vectors and the reliability values thereof corresponding to P8 (input image) is stored in BANK 2 of the motion vector memory 104.

First, the case where the encoding block coordinates (0, 0) are encoded is described as an example, and the information obtained in S402 is a value of the encoding block coordinates (0, 0) of the P8 frame. Specifically, it is the value of MB: (0, 0) in BANK 2 in the motion vector memory 104, which is indicated by reference numeral 301 in FIG. 3. The first motion vector of the block 301 is (10, 5), and the reliability value thereof is 50. Since this first motion vector is a motion vector obtained using the B7 frame as a reference image, there is a high possibility that the image included in the encoding block coordinates (0, 0) of the P8 frame is included in the vicinity of coordinates (10, 5) in the reduced image level in the B7 frame. Here, since an encoding block is assumed to have 4 pixels horizontally and vertically in the reduced image level, the encoding block coordinates including (10, 5) are (2, 1) in the reduced image level.

Since information on first motion vectors and reliability values thereof corresponding to the B7 frame is stored in BANK 1 of the motion vector memory 104, information on the encoding block coordinates (2, 1) of the B7 frame is next obtained in S407. Specifically, the information is the value of MB: (2, 1) in BANK 1 in FIG. 3, which is indicated by reference numeral 302. The first motion vector of the block 302 is (9, 4), and the reliability value thereof is 57.

Here, updating a composite motion vector is described. In a case where a composite motion vector before updating is (10, 5), whereas the newly obtained first motion vector is (9, 4), the composite motion vector after updating will be (19, 9). Specifically, the composite motion vector before updating (the first motion vector of the block 301 in this example) may be added to the first motion vector of the block 302, and based on the value of the composite motion vector obtained by this addition, the value of the composite motion vector before updating is updated (S411).

Next, for each block in the B7 frame, a first motion vector and a reliability value thereof are obtained using B6 as a reference image, which is the immediately preceding frame in the input order. Based on information on this B7 frame, there is a high possibility that the image included in the encoding block coordinates (0, 0) of the P8 frame, which is the starting point of the composite motion vector, is included in the vicinity of coordinates (19, 9) in the reduced image level in the B6 frame. The encoding block coordinates including the coordinates (19, 9) in the reduced image level are (4, 2).

Since information on the first motion vectors and the reliability values thereof corresponding to the B6 frame is stored in BANK 0 in the motion vector memory 104, information on the encoding block coordinates (4, 2) of the B6 frame is next obtained in S407, when it is performed for the second time. Specifically, this information is the value of MB: (4, 2) in BANK 0 in FIG. 3, which is indicated by reference numeral 303. The first motion vector of the block 303 is (10, 5), and the reliability value thereof is 66. The first motion vectors of 301, 302, and 303 are added so as to obtain a composite motion vector (29, 14), and the value of the composite motion vector before updating is updated based on this value (S411). As a result, based on the value of the final composite motion vector, it is judged that there is a high possibility that the image included at the encoding block coordinates (0, 0) of the P8 frame is included in the vicinity of coordinates (29, 14) in the reduced image level in the P5 frame.

Further, the maximum value of the reliability values of the blocks 301, 302, and 303 is used as the reliability value of this composite motion vector, which is 66 in this case (S408, S409). If this reliability value is smaller than a certain threshold value, then it is determined that the degree of reliability of the corresponding motion vector is high. In the present embodiment, the threshold value is set to 300, and it is determined that the cumulatively added motion vector has a high degree of reliability (S403, S410). Through the above processing, it is determined that the search center used when performing motion compensation of the encoding block coordinates (0, 0) of the P8 frame is (116, 56) of the P5 frame, when converted into the unreduced image pixel level (×4 pixels).

Next, the case where the encoding block coordinates (1, 0) are encoded is described as an example. A composite motion vector is generated in the same manner as that of the operation described above, that is, the first motion vectors of the blocks 304, 305, and 306 are cumulatively added. The calculated composite motion vector is (11, 13) in the reduced image level, and the reliability value thereof is 632. However, since an encoding block whose reliability value is greater than 300, which is the threshold value, is included, the degree of reliability of the cumulatively added motion vector is low, and thus is not adopted. In such a case, the composite motion vector just before, in the process of cumulative addition, the reliability value of the individual encoding blocks is judged as being greater than or equal to the threshold value in S410 is obtained. Then, a composite motion vector from the P8 frame to the P5 frame is estimated by extrapolation from the ratio of the temporal distance to the reference image using the composite motion vector obtained by adding only the first motion vectors whose reliability values do not exceed the threshold value. For example, if the value of the composite motion vector is MVc, the number of vectors added to generate the composite motion vector is Vn, and the inter-frame distance (the number of frames) between the frame to be encoded and the reference frame is Fn, the composite motion vector MVe that is estimated by extrapolation is obtained using the following equation.

$$MVe = MVc \times Fn/Vn$$

In the example in FIG. 3, since the reliability value of 305 is greater than the threshold value, the motion vector (11, 6) up to 304 is a composite motion vector just before the reliability value is greater than or equal to the threshold value. As a result, using the composite motion vector and the extrapolated motion vector, a composite motion vector up to the P5 frame is estimated for the image included in the encoding block coordinates (1, 0) of the P8 frame, thereby determining the search center used when performing motion compensation.

Note that in the example in FIG. 3, the motion vector of 304 is again added and tripled, and accordingly the motion vector obtained by performing addition again is (33, 18). Therefore, it is determined that the search center used when performing motion compensation of the encoding block coordinates (1, 0) of the P8 frame is (132, 72) of the P5 frame, when converted into an unreduced image pixel level (×4 pixels).

Note that here, although a composite motion vector is obtained by adding vectors from a frame to be encoded to a reference frame, the cumulative addition may be stopped at the point in time when a motion vector judged as having a low degree of reliability appears in the process of calculating a composite vector, determining that the degree of reliability of the composite motion vector is low.

Next, the case where encoding block coordinates (2, 0) are encoded is described as an example. If a composite motion vector is generated by performing cumulative addition in the same manner as that of the operation described above, first, the first motion vector of the block 307 and the reliability value thereof are obtained (S402). The reliability value is 769, and thus it is judged that the degree of reliability is low. In such a case, if the degree of reliability of a motion vector used as the starting point of cumulatively adding motion vectors is low ("NO" in S403), it is not possible to calculate a motion vector by performing cumulative addition in accordance with the temporal distance to a reference image as described above. In such a case, it is determined that the search center used when performing motion compensation of the encoding block coordinates (2, 0) of the P8 frame is (2, 0) of the P5 frame, based on the addition motion vector being zero.

FIGS. 6A and 6B are conceptual diagrams illustrating the way to obtain a composite motion vector. FIG. 6A shows an example in which a football is moving from the left to the right in the state where the background is mostly stationary, and the football is passing in front of a tree.

The example in FIG. 6A corresponds to the case of encoding the encoding block coordinates (0, 0) in FIG. 3 described above. In particular, a composite motion vector of the input images from n to n−3 is calculated using the method described above with respect to the block including the football, which is a moving object, thereby enabling tracking an inter-frame motion vector according to the moving object. Further, it is possible to determine a search center and a search area for searching a motion vector appropriate for the moving object in a reference frame.

Thus, in the present embodiment, if a frame image that is not temporally adjacent to the frame to be encoded is a reference frame, a plurality of first motion vectors related to images included between the input image and the reference frame are tracked. Then, a composite motion vector obtained by adding the plurality of tracked first motion vectors such that they are successive is calculated, and the position where motion search is to be performed in the reference frame is determined for each of the blocks of the input image using the composite motion vector.

On the other hand, FIG. 6B shows an example in which a football is moving from the left to the right in the state where the background is mostly stationary, and the football is passing behind the tree.

The example in FIG. 6B corresponds to the case of encoding the encoding block coordinates (1, 0) in FIG. 3 described above. Since the football, which is a moving object, is hidden behind the tree at the time of the input image n−2, an incorrect value is calculated for the first motion vector for the input images from n−1 to n−2 with respect to the block including the football. In such a case, the reliability value will indicate an extremely high value. Accordingly, as described above, a composite motion vector is calculated by extrapolation using a first motion vector whose reliability value is smaller than the threshold value, and thereby a search center and a search area for searching a motion vector appropriate for the moving object can be determined in a reference frame.

The second motion search unit 106 sets, in a reference frame, a search area (search window: SW) of a prescribed size for each of the blocks based on the search area of a prescribed size using the search center determined by the search position determination unit 105 as the center. The second motion search unit 106 determines a second motion vector for each block in the search area. The first motion search unit 103 performs simple motion search using a reduced image, whereas the second motion search unit 106 performs motion search with an image having a normal resolution. The second motion search unit 106 reads out image data of an encoding block to be encoded of the P8 frame, and image data in the search area of an image obtained by reconstructing the P5 frame (reference frame) described later, from the frame memory 102. The second motion search unit 106 searches the image data in the search area for a portion having a high correlation with image data of the encoding block to be encoded, and determines a second motion vector.

A motion compensation encoding unit 107 performs predictive encoding using motion compensation in accordance with the second motion vector determined by the second motion search unit 106, and furthermore performs orthogonal transformation, quantization, and encoding including entropy encoding, so as to output a stream that is encoded data. Further, the motion compensation encoding unit 107 reconstructs an image by decoding the encoded image, and saves the reconstructed image in the frame memory 102 so that it can be used as a reference frame when encoding the following frame image.

It is possible to determine motion search centers that follow motion for each encoding block by performing the above operation, even in the case where a temporal distance to a reference image is long, and furthermore the motion is large. Further, it is also possible to search for appropriate motion vectors with respect to a moving image including an object that does not uniformly move in a frame image. Further, even if there is a motion vector with a low degree of reliability in the process of cumulatively adding the results of first motion search, it is possible to determine motion search centers that follow the motion.

Embodiment 2

Figure 5:
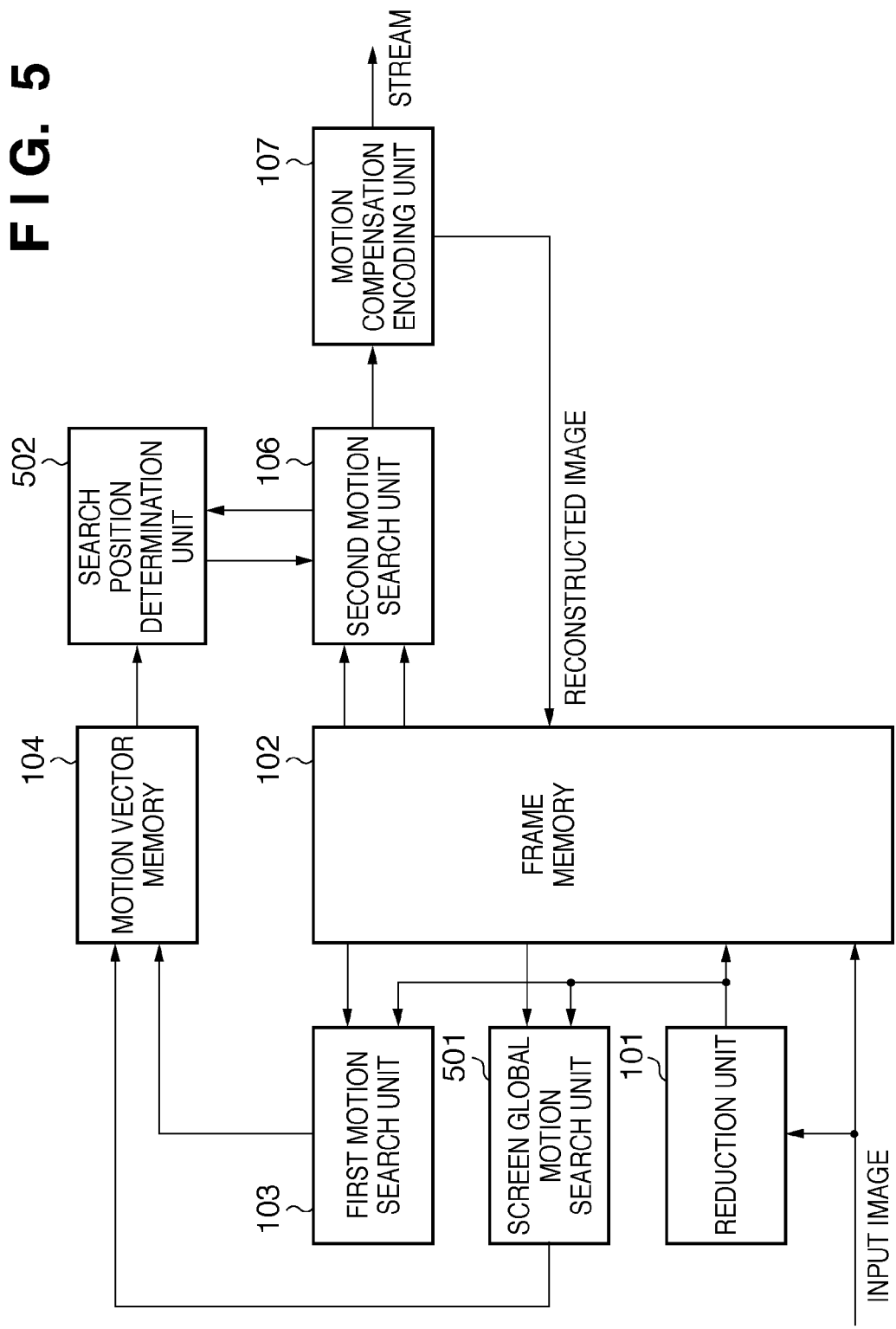
FIG. 5 is a block diagram showing the configuration of a moving image encoding apparatus according to Embodiment 2.

FIG. 5 is a block diagram showing the configuration of a moving image encoding apparatus according to Embodiment 2 of the present invention.

Below is a description of only those portions that differ from Embodiment 1, using the case of encoding the P8 frame as an example, which is the same as in Embodiment 1. A screen global motion search unit 501 obtains a motion vector of the entire screen (global vector) at an interval of one frame from a reduced input image and a reduced image of the immediately preceding frame stored in the frame memory 102. The screen global motion search unit 501 stores the obtained global vector in the motion vector memory 104. For a motion vector of the entire screen, pixel differences are calculated with the pixel position of the entire screen being shifted, and a position where the pixel difference is the smallest is determined as a motion vector, for example. The way to obtain a global vector is also disclosed in Japanese Patent Laid-Open No. 2005-354528, and thus a detailed description thereof is omitted.

A search position determination unit 502 determines a search center and a search area for searching a motion vector in accordance with first motion vectors of each frame image stored in the motion vector memory 104, reliability values thereof, and a global vector thereof.

Figure 7:
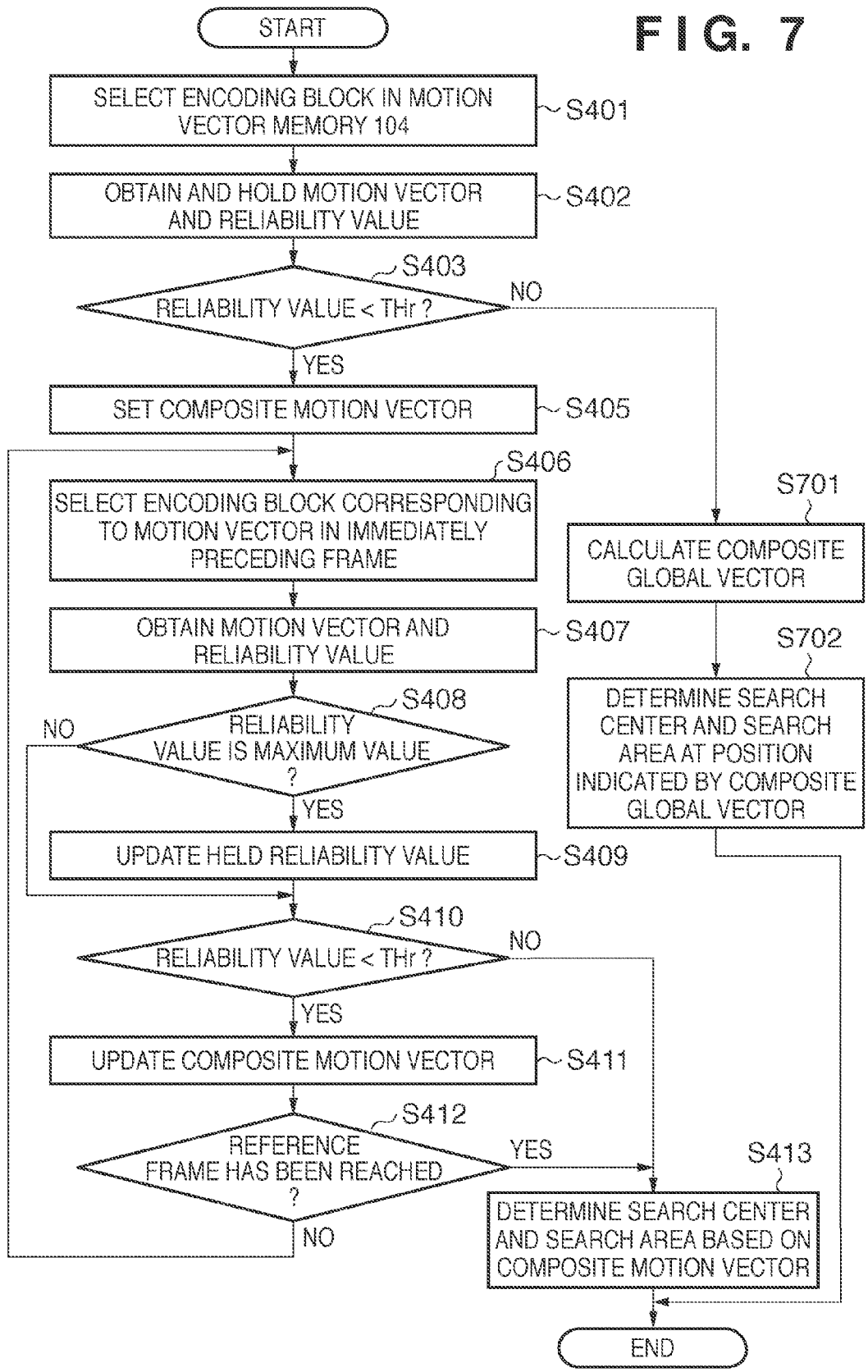
FIG. 7 is a flowchart of processing performed by a search position determination unit 502 according to Embodiment 2.

FIG. 7 is a flowchart showing an example of processing performed by the search position determination unit 502. Processing performed by the search position determination unit 502 is described with reference to the flowchart in FIG. 7. Note that the flowchart can be implemented by a computer such as a CPU that functions as the search position determination unit 502 executing a corresponding program (stored in a ROM or the like), for example.

In FIG. 7, steps S401 to S403 and S405 to S413 are the same as in Embodiment 1, and thus their further description is omitted. Here, if the reliability value of a first motion vector is greater than or equal to the threshold value THr (NO in S403), the degree of reliability is considered to be low, and the processing proceeds to S701.

For example, in the case of encoding the encoding block coordinates (2, 0) in FIG. 3, an appropriate composite motion vector cannot be calculated since the degree of reliability of the first motion vector is low. In such a case, the search position determination unit 502 reads out global vectors between the P8 and B7 frames, between the B7 and B6 frames, and between the B6 and P5 frames, respectively from among the global vectors stored in the motion vector memory 104. Then, in S701, the search position determination unit 502 calculates a composite global vector between the P8 and P5 frames by adding the read global vectors. Furthermore, in S702, the search position determination unit 502 converts the composite global vector between the P8 and P5 frames into an unreduced image level, and thereafter determines a search center and a search area of a prescribed size at a position indicated by the composite global vector. The motion vector search area determined in S702 will be used as a position where motion search is to be performed in a reference frame that is referenced by the second motion search unit 106 when performing motion compensation.

As described above, in the present embodiment, a method for determining a motion search position in accordance with a composite motion vector obtained by cumulatively adding first motion vectors and a method for determining a motion search position in accordance with a global vector are selectively executed. In this way, while obtaining the same effect as in Embodiment 1 described above, even in the case where the degree of reliability of a starting point for cumulatively adding the results of first motion search is low, it is possible to reduce the possibility of setting an incorrect search area.

Other Embodiments

Further, as other embodiments, the search position determination unit 105 may determine a search center based on a motion vector of an encoding block that has already been encoded and that is adjacent to an encoding block to be encoded. The output of the second motion search unit 106 is input to the search position determination unit 105, and the search position determination unit 105 can obtain a motion vector of the adjacent encoding block.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-225570 filed Sep. 29, 2009 and 2010-200292 filed Sep. 7, 2010 which are hereby incorporated by reference herein in their entirety.

What is claimed is:

1. A moving image encoding apparatus configured to divide an input image into a plurality of blocks, and to perform predictive encoding using motion compensation for each of the plurality of blocks, the moving image encoding apparatus comprising:
a first motion search unit configured to calculate, using the input image and an image that is positioned temporally immediately preceding the input image, a difference between pixel values for each of the plurality of blocks, and to calculate a first motion vector for each of the plurality of blocks based on a positional relationship in which the difference is minimal;
a motion vector memory configured to store the first motion vectors in association with positions of the plurality of blocks of the input image, and to hold the first motion vectors related to a plurality of temporally successive images;
a search position determination unit configured to determine for each of the plurality of blocks, in accordance with the first motion vectors held in the motion vector memory, a position where motion search is to be performed in a reference image that is referenced when motion compensation is performed;
a second motion search unit configured to set, based on the position determined by the search position determination unit, a search area of a prescribed size in the reference image for each of the plurality of blocks, and to determine, within the search area, a second motion vector for each of the plurality of blocks; and
an encoding unit configured to perform predictive encoding using motion compensation based on the second motion vector determined by the second motion search unit,
wherein, if an image that is not temporally adjacent to the input image is the reference image, with a method for selecting, using each of the plurality of blocks of the input image as a starting point, a block of an immediately preceding image in accordance with the first motion vector corresponding to a position of the block, the search position determination unit tracks a plurality of the first motion vectors related to images between the input image and the reference image, calculates a composite motion vector that is obtained by adding the plurality of tracked first motion vectors such that the plurality of first motion vectors are successive, and determines, based on the composite motion vector, a position where motion search is to be performed in the reference image for each of the plurality of blocks.

2. The moving image encoding apparatus according to claim 1,
wherein the first motion search unit calculates a reliability value that indicates a degree of reliability of the first motion vector,
the motion vector memory further stores the reliability value in association with the corresponding first motion vector, and
the search position determination unit judges a degree of reliability of the first motion vector according to the reliability value, and calculates the composite motion vector by cumulatively adding only the first motion vectors that have been judged as having a high degree of reliability.

3. The moving image encoding apparatus according to claim 2,
wherein if there is a first motion vector that has been judged as having a low degree of reliability, the search position determination unit determines a position where motion search is to be performed in the reference image using a composite motion vector that is calculated by not adding the first motion vector that has been judged as having a low degree of reliability, but again adding the first motion vector that has been judged as having a high degree of reliability.

4. The moving image encoding apparatus according to claim 2,
wherein if a degree of reliability of the first motion vector of a block used as the starting point has been judged as being low, the search position determination unit determines a position of the block as a center of the motion search.

5. The moving image encoding apparatus according to claim 2, further comprising a global motion search unit configured to calculate a global vector by comparing pixel values of the input image and pixel values of an image that is positioned temporally immediately preceding the input image,
   wherein if a degree of reliability of the first motion vector of a block used as the starting point has been judged as being low, the search position determination unit determines a center of the motion search at a position that is determined by cumulatively adding the global vectors from the input image to the reference image.

6. A moving image encoding apparatus configured to divide an input image into a plurality of blocks, and to perform predictive encoding using motion compensation for each of the plurality of blocks, the moving image encoding apparatus comprising:
   a first motion search unit configured to calculate, using the input image and an image that is positioned temporally immediately preceding the input image, a difference between pixel values for each of the plurality of blocks, and calculates a first motion vector for each of the plurality of blocks based on a positional relationship in which the difference is minimal;
   a global motion search unit configured to calculate a global vector by comparing pixel values of the input image and pixel values of an image that is positioned temporally immediately preceding the input image;
   a motion vector memory configured to store the first motion vectors in association with positions of the plurality of blocks of the input image, and holds the first motion vectors related to a plurality of temporally successive images;
   a search position determination unit configured to determine, for each of the plurality of blocks, in accordance with the first motion vectors held in the motion vector memory and the global vector, a position where motion search is to be performed in a reference image that is referenced when motion compensation is performed;
   a second motion search unit configured to set, based on the position determined by the search position determination unit, a search area of a prescribed size in the reference image for each of the plurality of blocks, and determines a second motion vector in the search area for each of the plurality of blocks; and
   an encoding unit configured to perform predictive encoding using motion compensation based on the second motion vector determined by the second motion search unit.

7. The moving image encoding apparatus according to claim 6,
   wherein if an image that is not temporally adjacent to the input image is the reference image, the search position determination unit selectively executes a method for determining, based on a composite motion vector, a position where motion search is to be performed in the reference image for each of the plurality of blocks by tracking a plurality of the first motion vectors related to images between the input image and the reference image with a method for selecting, using each of the plurality of blocks of the input image as a starting point, a block of the immediately preceding image in accordance with the first motion vector corresponding to a position of the block, and calculating the composite motion vector that is obtained by adding the plurality of tracked first motion vectors such that the plurality of first motion vectors are successive, and a method for determining, in accordance with the global vector, a position where motion search is to be performed in the reference image for each of the plurality of blocks.

8. A control method for a moving image encoding apparatus configured to divide an input image into a plurality of blocks, and to perform predictive encoding using motion compensation for each of the plurality of blocks, the control method comprising:
   a first motion search step for calculating, using the input image and an image that is positioned temporally immediately preceding the input image, a difference between pixel values for each of the plurality of blocks, and for calculating a first motion vector for each of the plurality of blocks based on a positional relationship in which the difference is minimal;
   a step for associating the first motion vectors with positions of the plurality of blocks of the input image, and for causing a motion vector memory to hold the first motion vectors related to a plurality of temporally successive images;
   a search position determination step for determining for each of the plurality of blocks, in accordance with the first motion vectors held in the motion vector memory, a position where motion search is to be performed in a reference image that is referenced when motion compensation is performed;
   a second motion search step for setting, based on the position determined in the search position determination step, a search area of a prescribed size in the reference image for each of the plurality of blocks, and for determining, within the search area, a second motion vector for each of the plurality of blocks; and
   an encoding step for performing predictive encoding using motion compensation based on the second motion vector determined in the second motion search step,
   wherein if an image that is not temporally adjacent to the input image is the reference image, with a method for selecting, using each of the plurality of blocks of the input image as a starting point, a block of an immediately preceding image in accordance with the first motion vector corresponding to a position of the block, in the search position determination step, a plurality of the first motion vectors related to images between the input image and the reference image are tracked, a composite motion vector that is obtained by adding the plurality of tracked first motion vectors such that the plurality of first motion vectors are successive is calculated, and based on the composite motion vector, a position where motion search is to be performed in the reference image is determined for each of the plurality of blocks.

9. A control method for a moving image encoding apparatus configured to divide an input image into a plurality of blocks, and perform predictive encoding using motion compensation for each of the plurality of blocks, the control method comprising:
   a first motion search step for calculating, using the input image and an image that is positioned temporally immediately preceding the input image, a difference between pixel values for each of the plurality of blocks, and for calculating a first motion vector for each of the plurality of blocks based on a positional relationship in which the difference is minimal;
   a global motion search step for calculating a global vector by comparing pixel values of the input image and pixel values of an image that is positioned temporally immediately preceding the input image;

a step for associating the first motion vectors with positions of the plurality of blocks of the input image, and for causing a motion vector memory to hold the first motion vectors related to a plurality of temporally successive images;

a search position determination step for determining, for each of the plurality of blocks, in accordance with the first motion vectors held in the motion vector memory and the global vector, a position where motion search is to be performed in a reference image that is referenced when motion compensation is performed;

a second motion search step for setting, based on the position determined by the search position determination unit, a search area of a prescribed size in the reference image for each of the plurality of blocks, and for determining a second motion vector in the search area for each of the plurality of blocks; and an encoding step for performing predictive encoding using motion compensation based on the second motion vector determined by the second motion search unit.

10. A non-transitory computer-readable storage medium having stored therein a program for causing a computer to execute a control method for a moving image encoding apparatus configured to divide an input image into a plurality of blocks, and to perform predictive encoding using motion compensation for each of the plurality of blocks, the control method comprising:

a first motion search step for calculating, using the input image and an image that is positioned temporally immediately preceding the input image, a difference between pixel values for each of the plurality of blocks, and for calculating a first motion vector for each of the plurality of blocks based on a positional relationship in which the difference is minimal;

a step for associating the first motion vectors with positions of the plurality of blocks of the input image, and for causing a motion vector memory to hold the first motion vectors related to a plurality of temporally successive images;

a search position determination step for determining for each of the plurality of blocks, in accordance with the first motion vectors held in the motion vector memory, a position where motion search is to be performed in a reference image that is referenced when motion compensation is performed;

a second motion search step for setting, based on the position determined in the search position determination step, a search area of a prescribed size in the reference image for each of the plurality of blocks, and for determining, within the search area, a second motion vector for each of the plurality of blocks; and an encoding step for performing predictive encoding using motion compensation based on the second motion vector determined in the second motion search step, wherein if an image that is not temporally adjacent to the input image is the reference image, with a method for selecting, using each of the plurality of blocks of the input image as a starting point, a block of an immediately preceding image in accordance with the first motion vector corresponding to a position of the block, in the search position determination step, a plurality of the first motion vectors related to images between the input image and the reference image are tracked, a composite motion vector that is obtained by adding the plurality of tracked first motion vectors such that the plurality of first motion vectors are successive is calculated, and based on the composite motion vector, a position where motion search is to be performed in the reference image is determined for each of the plurality of blocks.

11. A non-transitory computer-readable storage medium having stored therein a program for causing a computer to execute a control method for a moving image encoding apparatus configured to divide an input image into a plurality of blocks, and perform predictive encoding using motion compensation for each of the plurality of blocks, the control method comprising:

a first motion search step for calculating, using the input image and an image that is positioned temporally immediately preceding the input image, a difference between pixel values for each of the plurality of blocks, and for calculating a first motion vector for each of the plurality of blocks based on a positional relationship in which the difference is minimal;

a global motion search step for calculating a global vector by comparing pixel values of the input image and pixel values of an image that is positioned temporally immediately preceding the input image;

a step for associating the first motion vectors with positions of the plurality of blocks of the input image, and for causing a motion vector memory to hold the first motion vectors related to a plurality of temporally successive images;

a search position determination step for determining, for each of the plurality of blocks, in accordance with the first motion vectors held in the motion vector memory and the global vector, a position where motion search is to be performed in a reference image that is referenced when motion compensation is performed;

a second motion search step for setting, based on the position determined by the search position determination unit, a search area of a prescribed size in the reference image for each of the plurality of blocks, and for determining a second motion vector in the search area for each of the plurality of blocks; and an encoding step for performing predictive encoding using motion compensation based on the second motion vector determined by the second motion search unit.

* * * * *